(12) United States Patent
Miller et al.

(10) Patent No.: US 7,788,486 B2
(45) Date of Patent: Aug. 31, 2010

(54) SYSTEM AND METHOD FOR DISTRIBUTING AND CREATING PRESENTATIONS

(75) Inventors: Greg Miller, Asbury, NJ (US); Kevin McMurtry, Basking Ridge, NJ (US); Jeffrey Brady, Jersey City, NJ (US)

(73) Assignee: Advanced Health Media, LLC, Union City, NJ (US)

( * ) Notice: Subject to any disclaimer, the term of this patent is extended or adjusted under 35 U.S.C. 154(b) by 1301 days.

(21) Appl. No.: 10/949,826

(22) Filed: Sep. 24, 2004

(65) Prior Publication Data

US 2005/0091506 A1 Apr. 28, 2005

Related U.S. Application Data

(60) Provisional application No. 60/506,024, filed on Sep. 24, 2003, provisional application No. 60/551,400, filed on Mar. 9, 2004.

(51) Int. Cl.
*H04L 29/06* (2006.01)

(52) U.S. Cl. ............................ 713/158; 713/155; 705/44

(58) Field of Classification Search ........................ None
See application file for complete search history.

(56) References Cited

U.S. PATENT DOCUMENTS

| | | | |
|---|---|---|---|
| 5,124,912 A | 6/1992 | Hotaling et al. | |
| 5,889,945 A | 3/1999 | Porter et al. | |
| 5,899,979 A | 5/1999 | Miller et al. | |
| 5,930,471 A | 7/1999 | Milewski et al. | |
| 5,960,406 A | 9/1999 | Rasansky et al. | |
| 6,085,166 A | 7/2000 | Beckhardt et al. | |
| 6,151,582 A | 11/2000 | Huang et al. | |
| 6,223,177 B1 | 4/2001 | Tatham et al. | |
| 6,324,517 B1 | 11/2001 | Bingham et al. | |
| 6,442,567 B1 | 8/2002 | Retallick et al. | |
| 6,496,827 B2 * | 12/2002 | Kozam et al. ................. 707/10 |
| 6,557,009 B1 * | 4/2003 | Singer et al. ............. 707/104.1 |

(Continued)

OTHER PUBLICATIONS http//:Send2fax.com, 2000-2004. Printed from the Internet on Dec. 8, 2004.

(Continued)

*Primary Examiner*—Pramila Parthasarathy
(74) *Attorney, Agent, or Firm*—Connolly, Bove, Lodge & Hutz LLC

(57) ABSTRACT

A slide customization system, comprising an administrator, wherein at least one information presentation is received at the administrator, at least one database, wherein the at least one information presentation is stored, a validator, wherein validation of the at least one information presentation is performed by the validator by validating the at least one information presentation with at least one validation attribute selected by the administrator from a plurality of validation attributes, and wherein the validation of the selected ones of the validation attributes against the at least one information presentation is stored to said at least one database, and a compiler, wherein the compiler manipulates the selected ones of the validation attributes and the information presentation associated therewith in accordance with an output request, and in accordance with unique limitations of one or more of the selected ones of the validation attributes, and wherein the manipulation is in accordance with at least one output selected from the group consisting of a report, a search result, and an order placement is disclosed.

20 Claims, 35 Drawing Sheets

U.S. PATENT DOCUMENTS

| | | | |
|---|---|---|---|
| 6,591,300 | B1 | 7/2003 | Yurkovic |
| 6,760,731 | B2 | 7/2004 | Huff |
| 6,782,531 | B2 | 8/2004 | Young |
| 2001/0014856 | A1 | 8/2001 | Wuppermann et al. |
| 2001/0014865 | A1 | 8/2001 | Franke |
| 2001/0034769 | A1 | 10/2001 | Rast |
| 2002/0016729 | A1 | 2/2002 | Breitenbach et al. |
| 2002/0111845 | A1 | 8/2002 | Chong |
| 2003/0177051 | A1 | 9/2003 | Driscoll et al. |
| 2004/0161090 | A1 | 8/2004 | Digate et al. |

OTHER PUBLICATIONS www.allmeetings.com (archived on www.archive.org, May 2000) [retrieved from Internet].

"PlanSoft Chooses b-there Platform to Deliver End-to-End Meeting and Attendee Management solutions," Business Wire, Apr. 12, 2001 [retrieved from Proquest].

www.b-there.com (archived on www.archive.org, Apr. 2001) [retrieved from Internet].

"seeUthere.com and PlanSoft Partner to Provide Online Event Planning Services," PR Newswire, Feb. 8, 2000 [retrieved from Proquest].

"mpoint.com Sets New Standard for Meeting and Convention Industry," PR Newswire, Sep. 6, 2000 [retrieved from Proquest].

"Convention & Visitors Bureaus Leverage PlanSoft's Industry Leading Technology to Attract More Meeting Professionals," Business Wire, Mar. 26, 2001 [retrieved from Proquest].

archived version from www.archive.org of www.allmeetings.com, May 2000 [retrieved from Internet].

"b-there.com and AllMeetings.com Partnership Revolutionizes Meeting Planning Process," PR Newswire, May 4, 2000 [retrieved from Proquest].

"b-there.com Announces First Web Site to Integrate Datalex—Web Ventures' Air Booking Engine with Negotiated Group Rate Capability," PR Newswire, Aug. 5, 1999 [retrieved from Proquest].

"b-there.com Selects eCal to Provide Integrated Web-Based Calendaring; meeting and Event Organizers Now Able to Manage Their Schedules Via the Web," PR Newswire, Jul. 8, 1999 [retrieved from Proquest].

"ASAE/PlanSoft Partnership Expands ASAE Web Site Provides Access Point to PlanSoft Network; Technology Training Center to Open," PR Newswire, Oct. 27, 1999 [retrieved from Proquest].

Williams, Kelly. "Plan your next meeting via the Web," Office Solutions, Aug. 2000 [retrieved from Proquest].

www.plansoft.com (archived on www.archive.org, Jun. and Aug. 2001) [retrieved from Internet].

* cited by examiner

| Slide Kit Name | Date Created | Date Last Modified | Number of Slides | Delete Kit | Download PowerPoint File |
|---|---|---|---|---|---|
| test2 | 6/20/2003 | 6/20/2003 | 4 | × | |
| Boston | 6/27/2003 | 6/27/2003 | 3 | × | |
| test4 | 7/1/2003 | 7/1/2003 | 2 | × | |
| test6 | 7/1/2003 | 7/1/2003 | 1 | × | |

Fig. 13

| Slide Kit Name | Date Created | Date Last Modified | Number of Slides | Delete Kit | Download PowerPoint File | Order Slides |
|---|---|---|---|---|---|---|
| Create a New Slide Kit | | | | | | |
| Test1 | 8/13/2001 | 8/13/2001 | 10 | X |  |  |
| Bryans Kit | 6/19/2003 | 6/19/2003 | 6 | X |  |  |
Fig. 16

| [Save] | | | |
|---|---|---|---|
| *Required Information | | | |
| First Name: | Amy | Last Name: | Spaugh |
| Password: | ●●●●●●● | Confirm Password: | ●●●●●●● |
| *Optional Information | | | |
| SSN #: | | | |
| Home Address 1: | | Home Address 2: | |
| Home City: | | Home State: | |
| Home Zip: | | | |
| Home Phone: | | Home Fax: | |
| Home Email: | | | |
| Business Address 1: | | Business Address 2: | |
| Business City: | | Business State: | |
| Business Zip: | | | |
| Business Phone: | | Business Fax: | |
| Business Email: | aspaugh@ahmdirect.com | | |
| Cell Phone: | | Beeper: | |

Fig. 21

New Presentation

Please provide a name for your Presentation:

[Save]

Fig. 23

Promotional
[Back] [Upload]

| Delete | Edit PPT File | Slide Count |
|---|---|---|
| X | Ortho Evra Promotional Lecture Series.ppt | 57 |
| X | Ortho Tri-Cylcen Lo A New Option in Oral Contraception.ppt | 66 |

Fig. 24

Click on the "Browse" button to select the file to upload. Once the file has been selected, click "Upload" to send the file.

[Browse...]

[Upload]

Edit Slide - Promotional

[Back] [Save]

| Title: | Slide 1 |
|---|---|
| Categories: | ☐ Oral Contraception<br>☑ Ortho Evra |

Fig. 28

User Manager

[A] [B] [C] [D] [E] [F] [G] [H] [I] [J] [K] [L] [M] [P] [R] [S] [T] [U] [W] [Y] [Z] - [Add New]

| Delete | Edit User | Logon | Email |
|---|---|---|---|
| X | Abel-Beyd, Geddifs | Geddis_Abel-Bey | gabelbey713@pol.net |
| X | Adler, Alf | Alf_Adler | adlercenter@aol.com |
| X | Allmen, Tara | Tara_Allmen | TaraAllmen@aol.com |
| X | Anand, Indu | Indu_Anand | ianand@utmem.edu |
| X | Anderson, Donna | Donna_Anderson | lizqb@juno.com |
| X | Ansbacher, Rudi | Rudi_Ansbacher | ansbache@umich.edu |
| X | Applegate, James | James_Applegate | docapple@pol.net |
| X | Atkinson, Samuel | Samuel_Atkinson | atkinsons@mail.ecu.edu |

SYSTEM AND METHOD FOR DISTRIBUTING AND CREATING PRESENTATIONS

CROSS REFERENCE TO RELATED APPLICATIONS

This application claims priority to U.S. Provisional Patent Application Ser. No. 60/506,024 entitled "SYSTEM AND METHOD FOR A PLANNER," filed Sep. 24, 2003, and provisional patent application U.S. Ser. No. 60/551,400, filed Mar. 9, 2004 which are hereby incorporated herein as if set forth herein in their entirety.

FIELD OF THE INVENTION

The invention relates to an organizer, and, more specifically, to a system and method for distributing and creating presentations, and/or related published information.

BACKGROUND OF THE INVENTION

Today's business environment demands that secure and precise information be effectively distributed between business principals and management, peers, subordinates, supporting departments, suppliers, customers, clients, and any number of authorities, such as government regulatory bodies. Obstacles to the dissemination of such information may prevent accurate decision making and may bring, for example, unnecessary liability upon those distributing, what may be, erroneous information.

The availability of secure and precise information may be limited by technology, such as by the absence of a central or assessable repository, and by the inherent limitations of human oversight. For instance, a presentation created by one author may be approved for content as accurate, but distributed only to select colleagues via email, for example. Approval of content may be limited due to the availability of an approval body, for example. A similar presentation may be created by a colleague, but may not be approved for a variety of reasons and may contain certain erroneous portions. Use and dissemination of the erroneous presentation may further increase miscommunication and misinformation between colleagues, or may lead to erroneous information being released to the public, which may lead to the breakdown of a sales message or, worse yet, to the assumption of legal liability due to the nature of erroneous information allowed to be included in the presentation.

Thus, there is a need for an invention that provides a systematic solution to presentation creation and dissemination. The present invention addresses these issues by providing a systematic apparatus and method for distributing and creating presentations, and/or related published information.

SUMMARY OF THE INVENTION

The present invention is directed to a slide customization system, comprising: an administrator, wherein at least one information item is received at the administrator; at least one database, wherein the at least one information item is stored; a validator, wherein validation of the at least one information item is performed by said validator by validating the at least one information item with at least one validation attribute selected by the administrator from a plurality of validation attributes, and wherein the validation of the selected ones of the validation attributes with the at least one information item is stored to said at least one database; a compiler, wherein said compiler manipulates the selected ones of the validation attributes and the information item associated therewith in accordance with an output request, and in accordance with unique limitations of one or more of the selected ones of the validation attributes, and wherein the manipulation is in accordance with at least one output selected from the group consisting of a report, a search result, and an order placement.

The present invention also includes a method for creating and disseminating presentations, said method comprising: receiving a logging onto the application; receiving a selection of at least one presentation from said information; searching said information utilizing a searcher; receiving a validation of said information; and generating reports concerning said information.

The present invention solves problems experienced with the prior art because it provides a systematic solution to information management and dissemination. Those and other advantages and benefits of the present invention will become apparent from the detailed description of the invention hereinbelow.

BRIEF DESCRIPTION OF THE DRAWINGS

Understanding of the present invention will be facilitated by consideration of the following detailed description of a preferred embodiment of the present invention taken in conjunction with the accompanying drawings, in which like numerals refer to like parts and in which:

FIG. 5 is an embodiment of a display of the current invention;

FIG. 7 is an embodiment of a display of the current invention;

FIG. 8 is an embodiment of a display of the current invention;

FIG. 13 is an embodiment of a display of the current invention;

FIG. 16 is an embodiment of a display of the current invention;

FIG. 17 is an embodiment of a display of the current invention;

Figure 18:
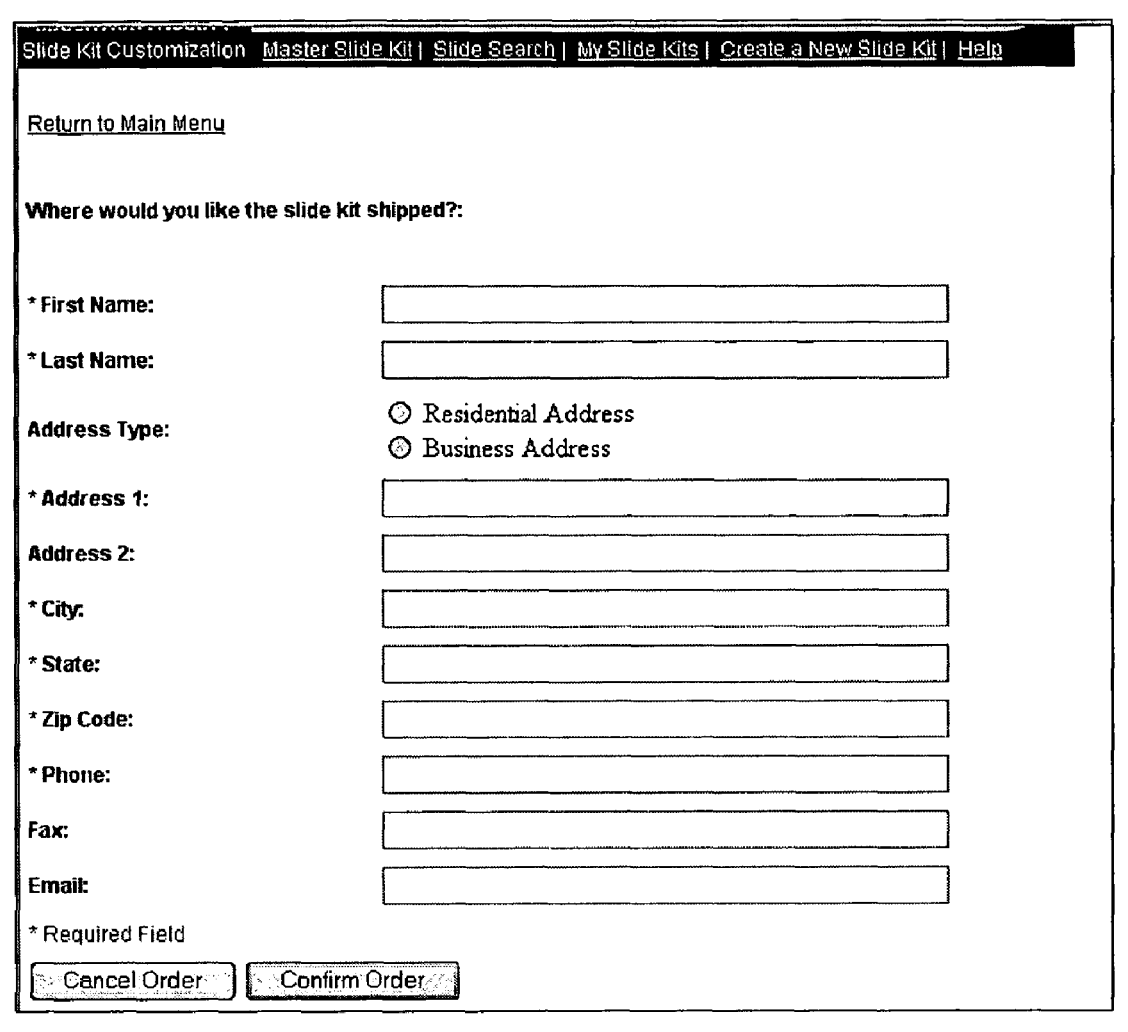

FIG. 18 is an embodiment of a display of the current invention;

FIG. 21 is an embodiment of a display of the current invention;

FIG. 23 is an embodiment of a display of the current invention;

FIG. 24 is an embodiment of a display of the current invention; and

FIG. 25 is an embodiment of a display of the current invention.

FIG. 27 is an embodiment of a display of the current invention;

FIG. 28 is an embodiment of a display of the current invention;

FIG. 31 is an embodiment of a display of the current invention;

FIG. 32 is an embodiment of a display of the current invention;

Figure 33:
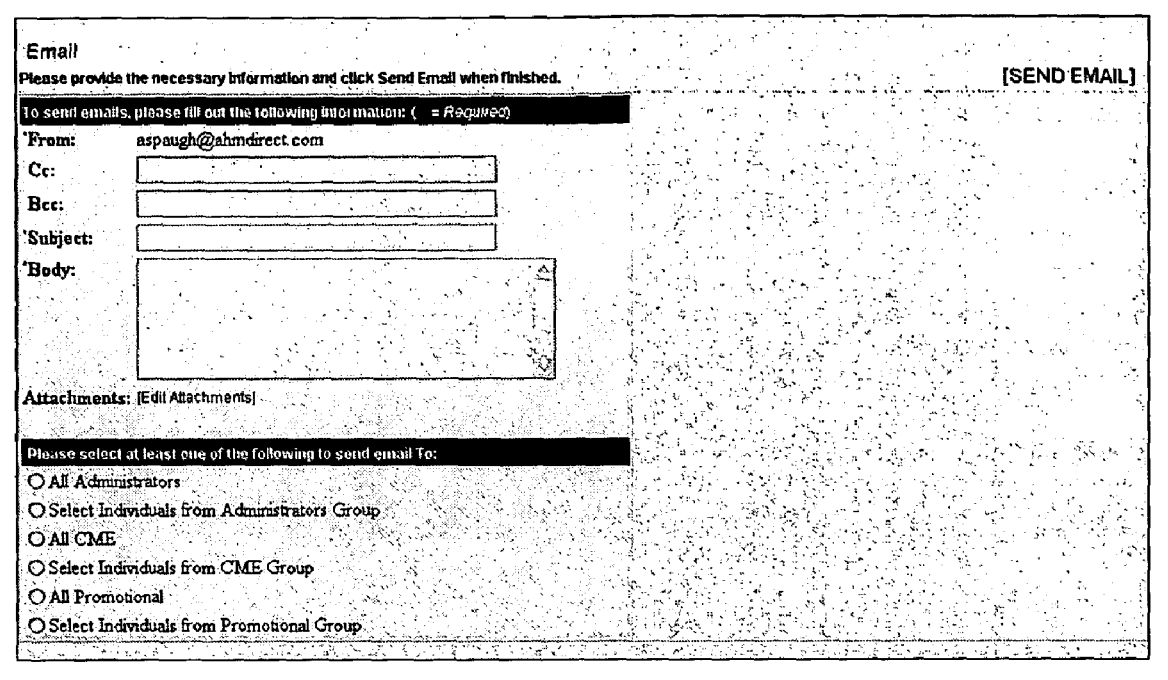

FIG. 33 is an embodiment of a display of the current invention; and

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical system and method. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure hereinbelow is directed to all such variations and modifications to planning technologies known, and as will be apparent, to those skilled in the art.

The present invention may include a plurality of tools, which may be organized, for example, in accordance with business rules, and which may include a data base, an organizer, a presentation builder, a viewer and sorter, and/or a validation function, and which may include corporate meetings, presentations, discussion groups, product development meetings, or any assemblage of people at a place for a common purpose. The present invention may allow designated users to create audio and/or visual works, such as a presentation, on-line and/or using or by a presentation builder. The present invention may utilize the communication provided by the network, in conjunction with an organized hierarchy of at least one data base, in order to allow users of the system to view, sort and create custom presentations utilizing pre-approved materials, for example, into an approved presentation, thereby improving the flow of information and the operational efficiency of personnel, such as presentation builders, and thereby reducing costs associated with the creation of presentations and increasing the control over information management.

Figure 1:
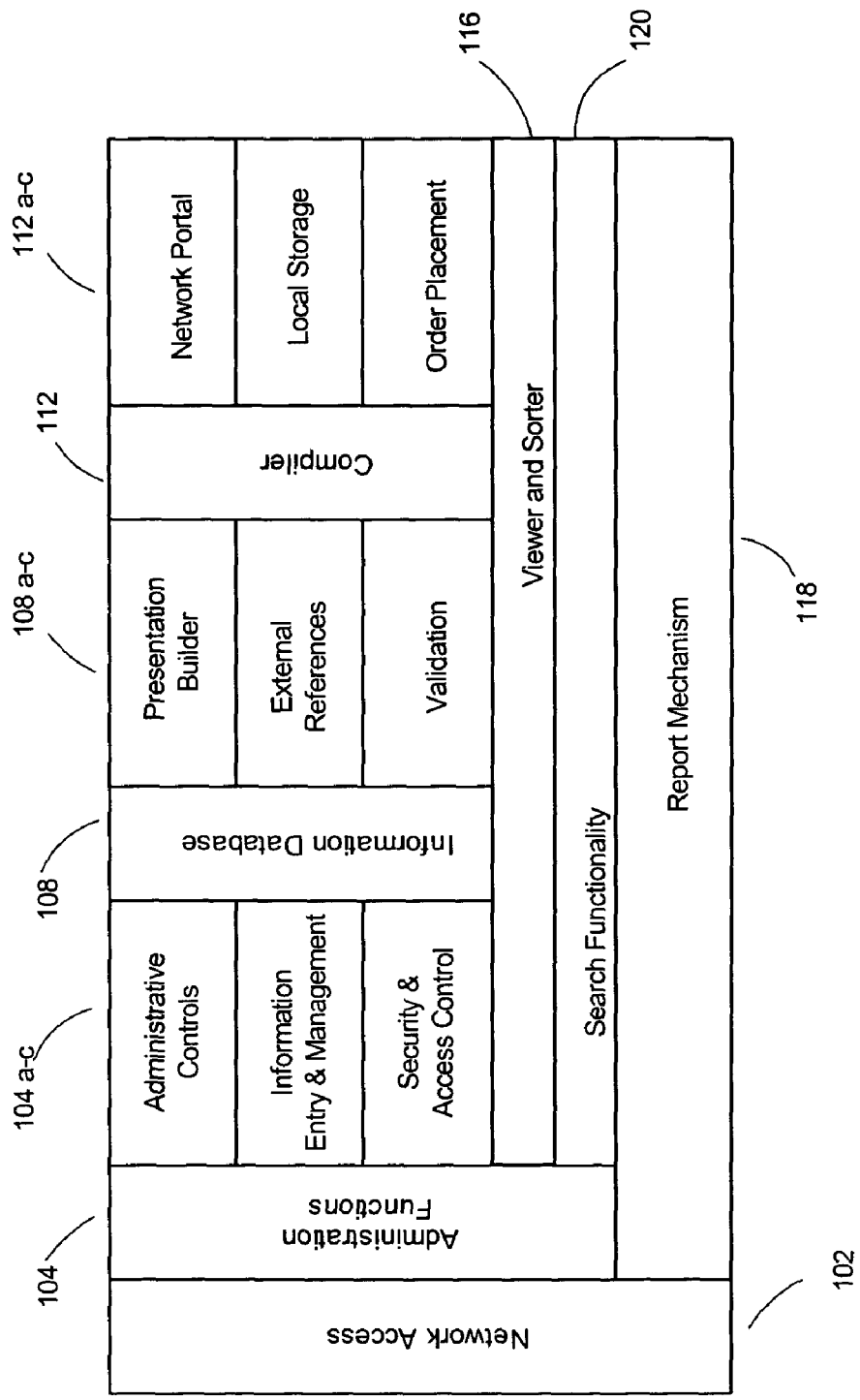
FIG. 1 is a block diagram of the present invention.

The present invention may enable users to access at least one database to generate, for example, multiple presentations for different products and projects within an enterprise, such as a client, to view and sort pre-existing presentations, to create custom presentations based on pre-existing information, to provide a search and retrieval system that allows for a detailed search of existing presentation materials, and to permit the publication of created and pre-existing publication materials such as, for example, by way of printing or downloading. The present invention may be utilized by multiple organizations, wherein each organization may have multiple products or other motivations for the dissemination of presentation materials. The users of the system may include, for example, system administrators, presentation planners, speakers, sales team members, educators, trainers, or other individuals or entities that may have a need to use presentation materials for the dissemination of information A slide customization system in accordance with the present invention is shown in FIG. 1. The slide customization system may be utilized, for example, for collecting, storing, building and disseminating information and ideas in many forms, such as, for example, slide presentations. Users may search, view, and organize information related to at least one document or slide presentation. Administrators may interact with the slide customization system to add information, provide interactive guidance on presentation selection, and control the flow of information, for example. Administrators may additionally control the use and content of the slide customization system. The slide customization system may include network access 102 to administration function modules 104, at least one database, such as an information database 108, for example, and a compiler 112. The slide customization system may also include a viewer and sorter 116 and search functionality 120, for example. The slide customization system may be, or may include, for example, a Microsoft Windows distributed internet applications architecture, as discussed further hereinbelow.

The administration function 104 may include administrative controls, information entry and management, and security and access control 104a-c. The information database 108 may include a presentation builder, external references, and a validation function 108a-c. The compiler 112 may include network portal, storage and order placement 112a-c. These functions may be supported by viewer and sorter 116, search functionality 120 and report mechanism 118.

The slide customization system of FIG. 1 may include this multiplicity of integrated components and at least one logical and/or relational database. A presentation in the slide customization system may necessitate or include one or more of the functions or modules of FIG. 1, depending on the requirements of the user. A presentation is at least one group of information of at least one type of information contained in the slide customization system. Information can be in the form of, for example, computer generated presentations, articles, overheads, 35 mm slides, brochures, and transcripts. Information may also include author, title, date, location and format, for example. Thus, for each piece of information, there may be a set of data attributes that may be tracked. Some of the data attributes for each piece may be required, and others may be used at the administrator's discretion.

The slide customization system may utilize, for example, dynamic link libraries (DLL) that link the information data, such as the administrator's choice of component and fields, and HTML, xml, or ASPX templates, for example. These DLLs may process the HTML templates before presentation to a user of the interface, replacing tags and information in the HTML template with the defining attributes captured. Thereby, the administrator may have control of the layout and presentation of the data, and the slide customization system may thus ensure that capture validation and storage of data is consistent across all information.

The information database 108 may include presentation builder, external references and validation functions, for example. The presentation builder may allow the user to create presentations, and may include the ability to assemble in any manner any portion of existing presentations and information within the system, for example. Further, one or more external references may be associated to information in the slide customization system. An external reference may include access to information not wholly contained within the system, or other pieces of information referring to non-included information, for example. One or more created presentations may be validated before compilation. Validation may include, for example, the verifying and approval of presentation content and references.

The reporting may report real time status of user activities, for example, a tabular format including site usage by functionality, hits to the slide customization system, user browser environment, user referral information and individual user usage. Reporting may be a real time, internet-based format for secure access from any computer having access to the network, such as the internet or an intranet, on which the slide customization system is resident. Users may, for example, export and download a report in Microsoft Excel format to a local machine from the reporting module. Pre-defined reports may be available for any selected period.

Security and access control 104c may authenticate a user. Users of the system may log into the system via an internet portal and access the system through the protections of a user name and password, for example. In addition, the security module may provide access control once the user has been authenticated. Multiple levels of access control may be defined. For example, one level may be for system administrators and another may be for a client user. System administrators may have full access to the application to add, delete and update the data, and client users may have limited access.

An auditing function may additionally be provided. The slide customization system may track creations, reads, updates, additions, edits and deletions from the databases, in order to provide a history of changes for auditing. The audit log may grow very large, and thus may require periodic purging. The audit log may track systems usage and help to resolve issues regarding data quality. Each audit record may be corresponded to a field in the person or place database or in the data captured, and may include a user ID and the date and time of any modification made, along with the new value for the field.

Figure 2:
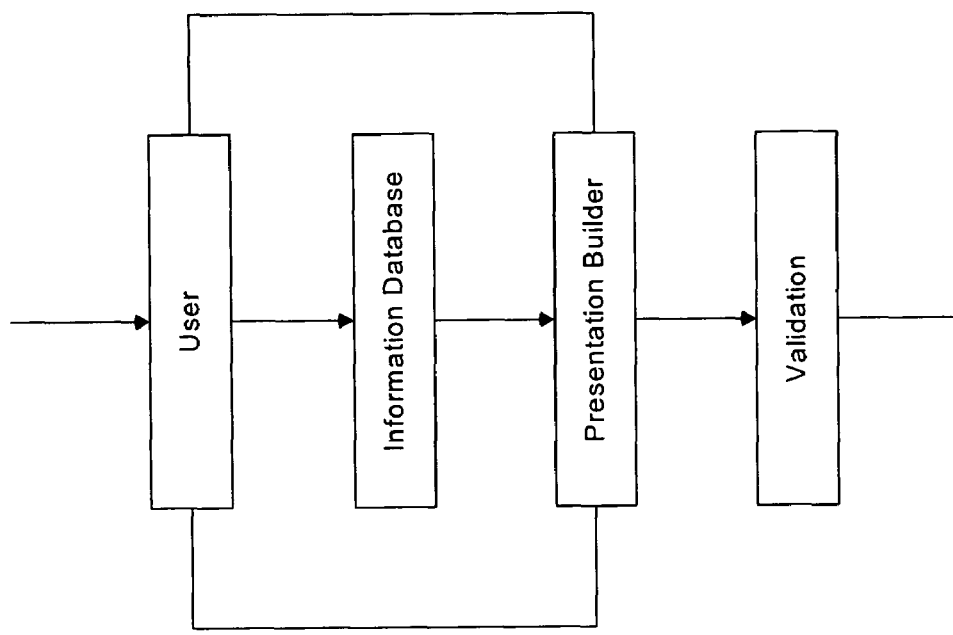
FIG. 2 is a block diagram of the present invention.

FIG. 2 represents an exemplary database, which may be, or be within, for example, an information listing. The information listing may provide a common store for any information and/or presentation data. Providing references to information in a single table may provide a consistent, normalized view of the data, and may provide a common access point for critical stores of information. Each piece of information may be stored in the information database, thereby providing a common value for all sub-systems. This common-valuing may allow analysis of attribute data across all information types.

Figure 3:
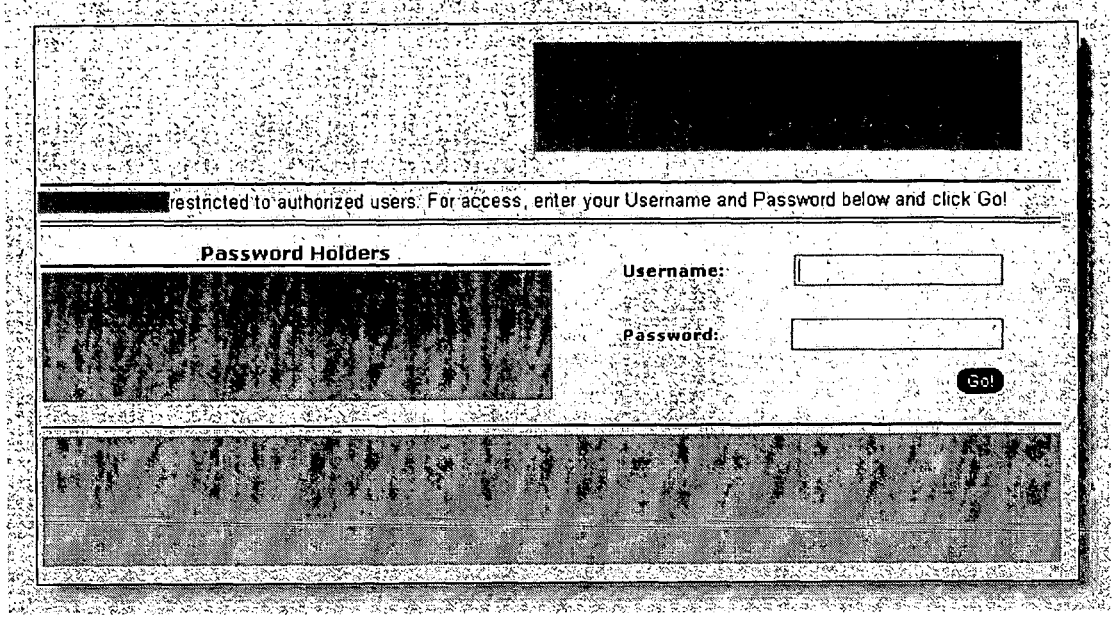
FIG. 3 is an embodiment of a display of the current invention.

In operation, a user may log-in, and that log-in may alert the slide customization system as to the functions to which that user may be granted access, and, if access is granted, to what level access may be exerted. Once connected and authenticated, the slide customization system may offer the user a menu of available choices. In an embodiment of the present invention shown in FIG. 3, users are prompted to enter a user name and password for access to the system. User name and passwords may be assigned before a user accesses the system, or may be created by a user or an authorized user of the system. If an unrecognized or invalid user name or password is entered and submitted to the system, the system may respond by allowing the user to try again, or may, alternatively, deny access to the slide customization system. The user may also contact the administrator via phone, e-mail or through a provided help screen. If a recognized user name and password is entered into the fields provided in FIG. 3 and the user clicks on the "Go" icon, the user may be permitted to enter the Slide Customization System.

Figure 4:
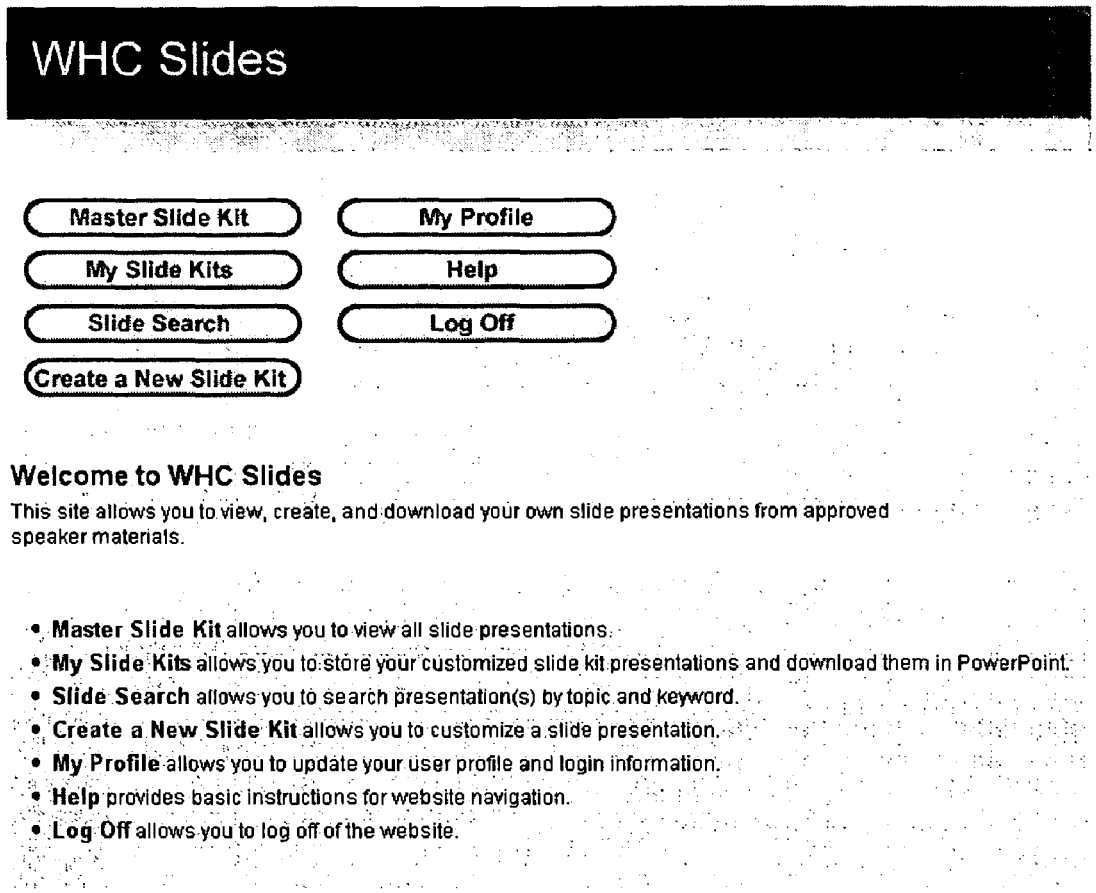
FIG. 4 is an embodiment of a display of the current invention.

FIG. 4 is an embodiment of the main menu of the Slide Customization System and may include buttons for accessing various modules of the application such as: Master Slide Kit, My Slide Kits, Slide Search, Create A New Slide Kit, My Profile, Help, and Log Off, for example. These individual modules from the main menu may allow users to view all of the master slide kits, search for individual slides based on slide note text content, view personalized slide kits, add to personalized slide kits, create new slide kits based on the content from the master slide kits, and conduct various administrative functions. More particularly, the Master Slide Kit button may allow the user access to view all the slide presentations contained within the system. Clicking the My Slide Kit button may allow a user to store customized slide kit presentations and may allow them to download the same presentations into third-party platforms such as Microsoft PowerPoint, for example. The Slide Search button may provide users the ability to search presentations within the system by topic and/or keyword. Further, the Create A New Slide Kit button may allow a user to customize slide presentations within the system. Clicking the My Profile button may allow a user to update his or her profile and log in information, while the Help button may provide access to basic instructions for website navigation. Further, the Log off button may allow users to log off the website securely.

Figure 5:
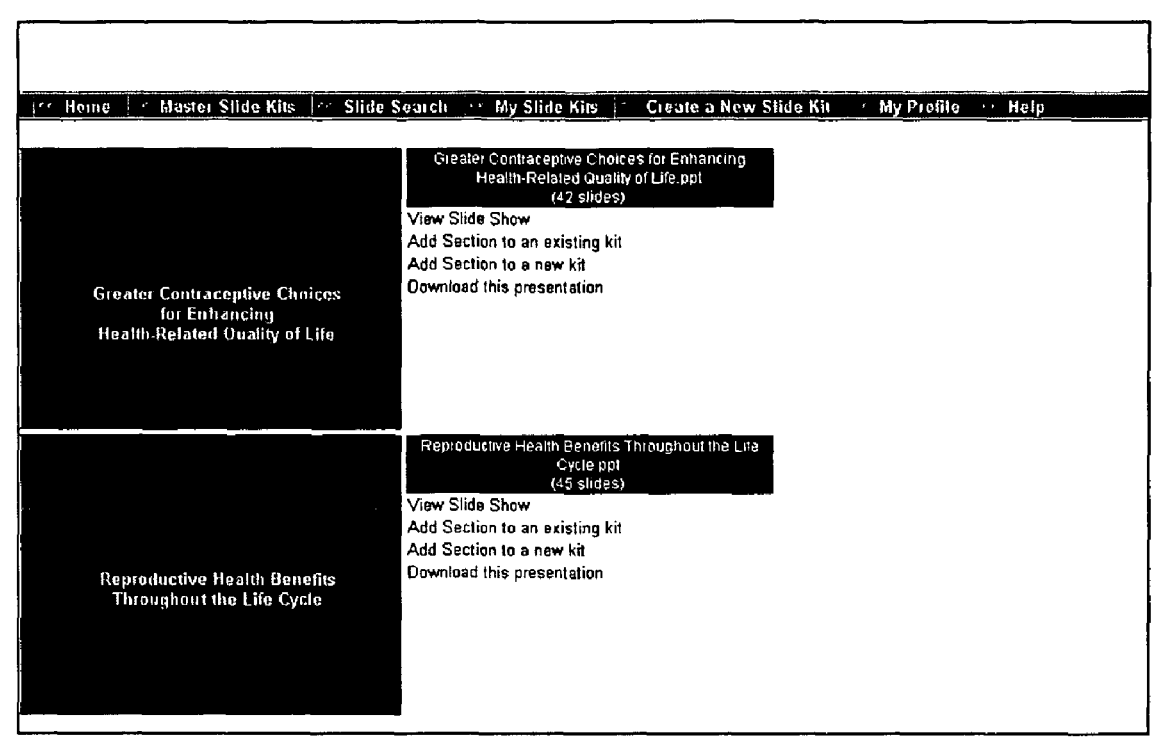

FIG. 5 illustrates an embodiment of the Master Slide Kits main menu which may be reached by a user after clicking the Master Slide Kit button as shown in FIG. 4. The system may contain several master slide kits and may represent topical presentations that can be used without modification or as a source of material for new or existing presentations. The slides and information included in the Master Slide Kits may be pre-approved by an administrator of the system and may further be limited by category, content and/or user access, for example. The Master Kits main menu may include several hyperlinked menu options such as, for example, Home, Master Slide Kits, Slide Search, My Slide Kit, Create New Slide Kit, My Profile and Help. Further, the main menu may also provide a description of, and access to, all of the slides contained within the system. If more slides are contained in the system than may be adequately shown on the Main Menu screen, a scroll bar may allow a user to view various slides in several segments. An individual slide may be represented by a header containing the title of the slide presentation's computer file name or other name associated with the slide presentation, for example. A slide presentation may also be represented in a Master Kits Main Menu by a portion of the actual slide presentation being shown, such as by using a thumbnail view, for example. Options for viewing and manipulating the slide presentation within the system may include options such as View Slide Show, Add Section to a New Kit, and/or Download This Presentation, for example. These options may be associated with each individual slide presentation shown in the Master Kits Main Menu. A user may click the View Slide Show button to view in its entirety the slide presentation as it exists in the system at that point. A user may click the Add Section To An Existing Kit which may allow the user to add new slides or existing slides from within the system to the current slide presentation being manipulated. Clicking the Add Section To A New Kit button may allow a user, for example, to add a portion of the chosen slide presentation to a new slide presentation thus allowing the user to build a new presentation based in part on pieces of slide presentations currently existing within the system. Further, a user may also click the Download This Presentation button allowing the user to download a presentation from the system in any suitable form, including but not limited to, a PowerPoint presentation or a Word Document, to a floppy diskette or via network to a desktop or similar information storage device.

Figure 6:
FIG. 6 is an embodiment of a display of the current invention.

As illustrated in FIG. 6 a user may view a slide show in its entirety after clicking on the View Slide Show button associated with an existing slide presentation within the system as illustrated in FIG. 5. A user of a system may manually advance the slides using the arrow buttons provided in the Master Kit Slide Show window or may click the Start Auto Slide Show button to advance each slide automatically. A user may also enter the amount of time the system should delay the advancement of each slide. By way of non-limiting example only, a user may enter 10 seconds as the interval between slides so as to instruct the system to automatically advance from slide to slide in 10 second intervals.

Figure 7:
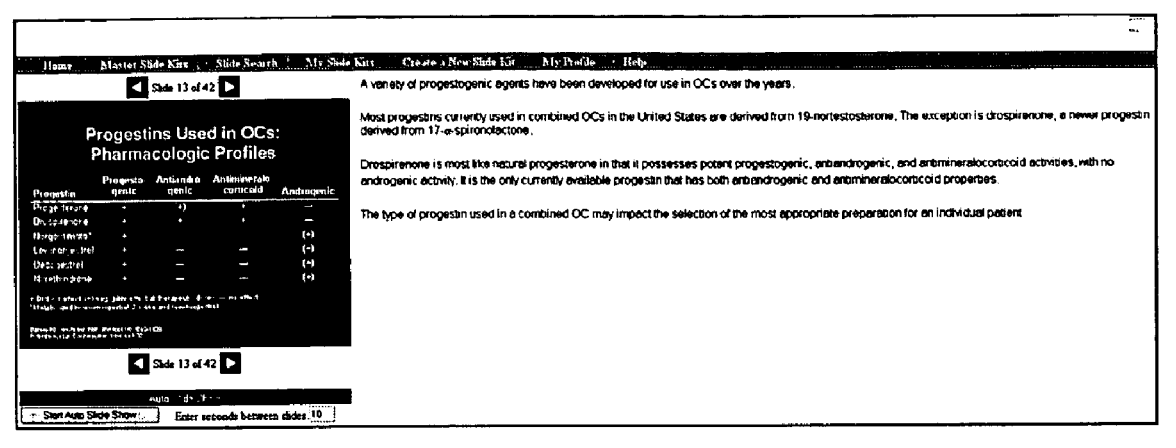

Another embodiment of the Master Kit Slide Show may include notes associated with the slide presentation. These notes may include comprehensive speaker's notes, their comments and/or comments of a user of the system, for example. Notes and comments associated with each slide in the slide presentation may be shown in conjunction with each individual slide. By way of non-limiting example only, Slide 13 of a slide presentation may have associated with it unique comments entered by the person who created that particular presentation; which notes may be viewed along with the individual Slide 13. After viewing slides, as illustrated in FIG. 7, a user may decide to incorporate all or a portion of the viewed slides into the user's own new or existing presentation saved within the system. By clicking the Add Section To An Existing List button or the Add Section To A New List Hyperlink button from the Master Slide Kits Main Menu window, a user may accomplish this function. A user may further download the entire slide kit as a PowerPoint presentation by clicking the Download This Presentation button hyperlink from the Master Slide Kits Main Menu window. These functions, as mentioned above, will be explained in greater detail below.

Figure 8:
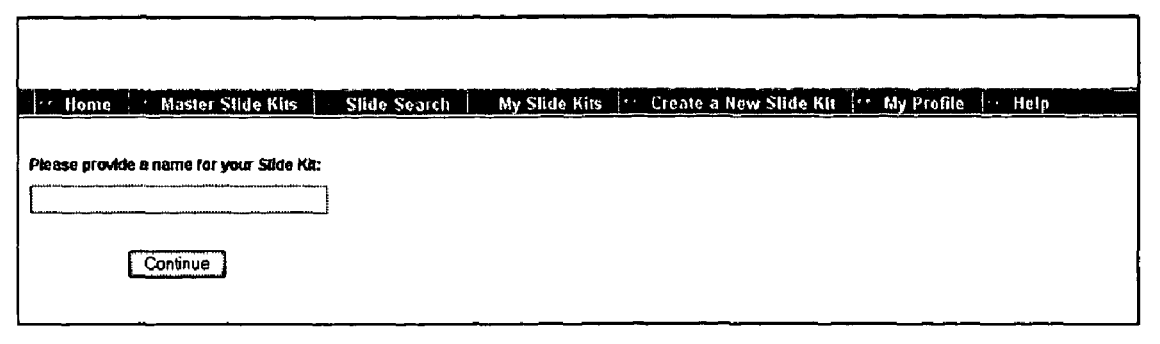
Figure 9:
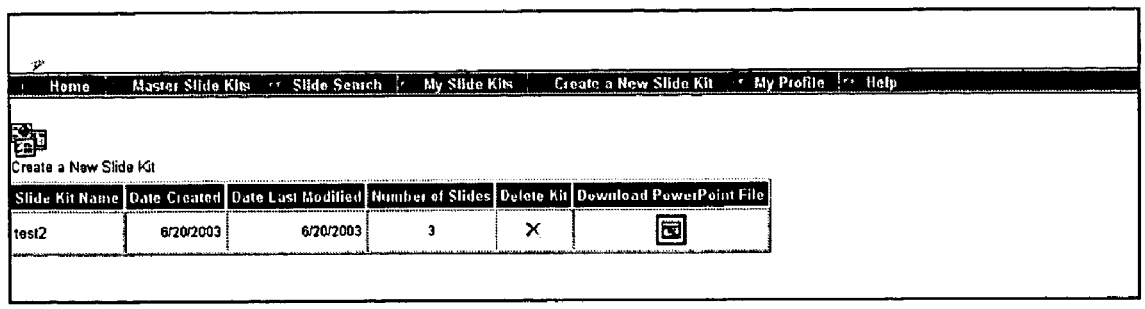
FIG. 9 is an embodiment of a display of the current invention.

Any given embodiment of the present invention may include several master slide kits providing topic presentations that may be used without modification or as source material for new or existing unique presentations. All or a portion of the components of the Master Slide Kits presented within the system may be utilized in the process for creating new slide kits by the user. By clicking the Create a New Slide Kit button as illustrated, for example, in FIG. 4 a user may access the Naming A New Customized Slide Kit window as illustrated in FIG. 8. The user may then enter the name for the slide kit to be created and may continue in the process of creating a new slide kit by clicking the Continue button, which will forward the user to the Creating A New Customized Slide Kit window as illustrated in FIG. 9. This window may include information regarding a newly created slide kit or existing kits created by the user within the system, which information may further include slide kit name, date created, date last modified, number of slides within the kit, for example. The list of newly created and existing kits may also provide the user the ability to delete individual kits within the system or download a particular kit from the system in any suitable form such as, for example, in a PowerPoint format.

Figure 10:
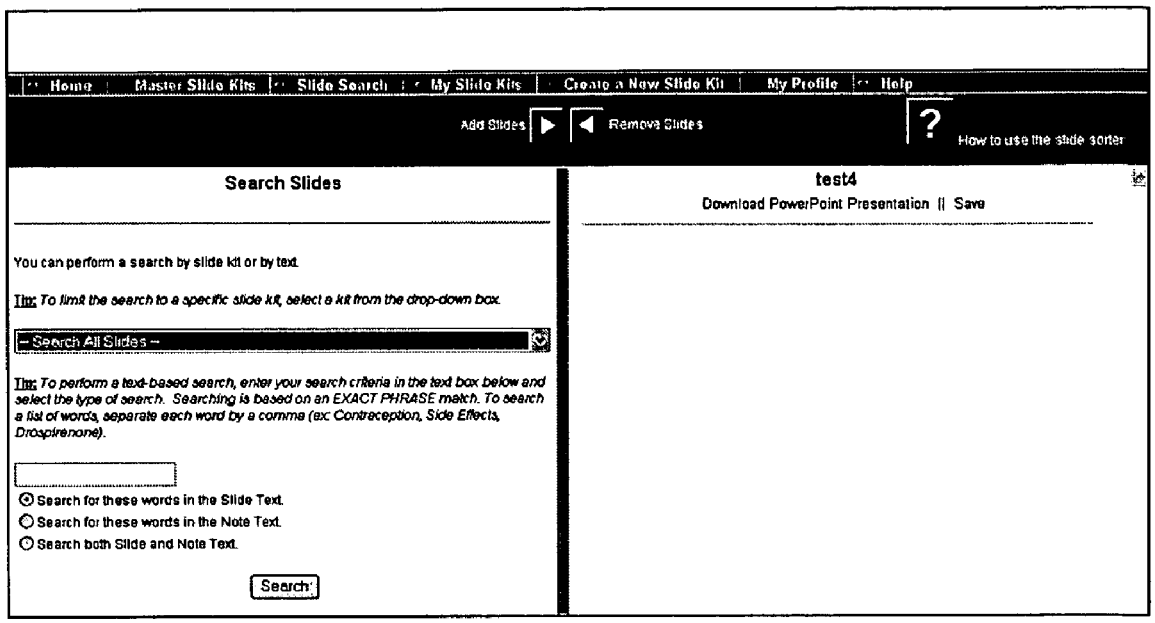
FIG. 10 is an embodiment of a display of the current invention.

Once again, by clicking the Create a New Slide Kit hyperlink, a user will be forwarded to the Searching for Master Kits window as illustrated in FIG. 10. The Searching for Master Kits window may be parsed into two portions and may include a Search Slides portion and a Create Kit portion. The Search Slides portion may include, for example, a dropdown box menu listing the titles of all of the presentation kits already existing within the system. The Search Slides portion may also provide a text box wherein a user may enter search phrases such as text strings and keywords for searching within the system both in the title of the presentations contained within the system and within the text of each presentation, for example. The user may choose a method for searching existing slides; either searching the words within the text of a slide, words within the notes associated with the slides or searching both slide and text notes or searching the title of the slide presentations themselves, for example. Once a search criteria has been chosen by the user and a search phrase has been entered in the text box, the user may search the system by clicking the Search hyperlink as illustrated in FIG. 10. The system search functionality may also default to a keyword search of all available slides unless otherwise indicated by the user.

Figure 11:
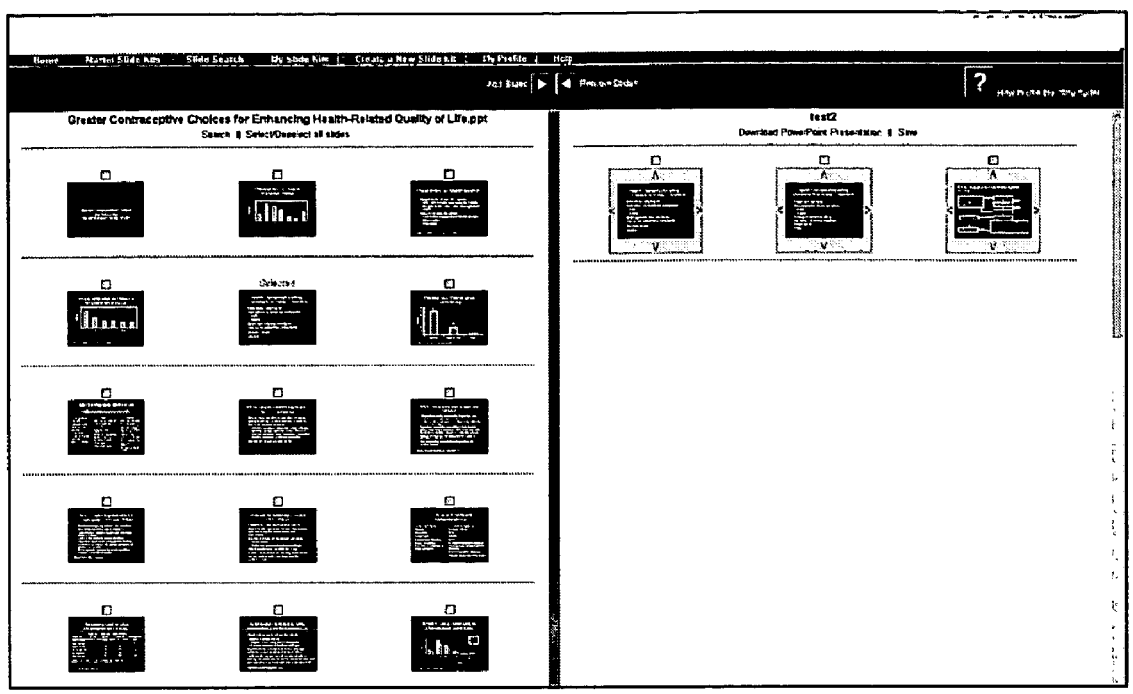
FIG. 11 is an embodiment of a display of the current invention.
Figure 12:
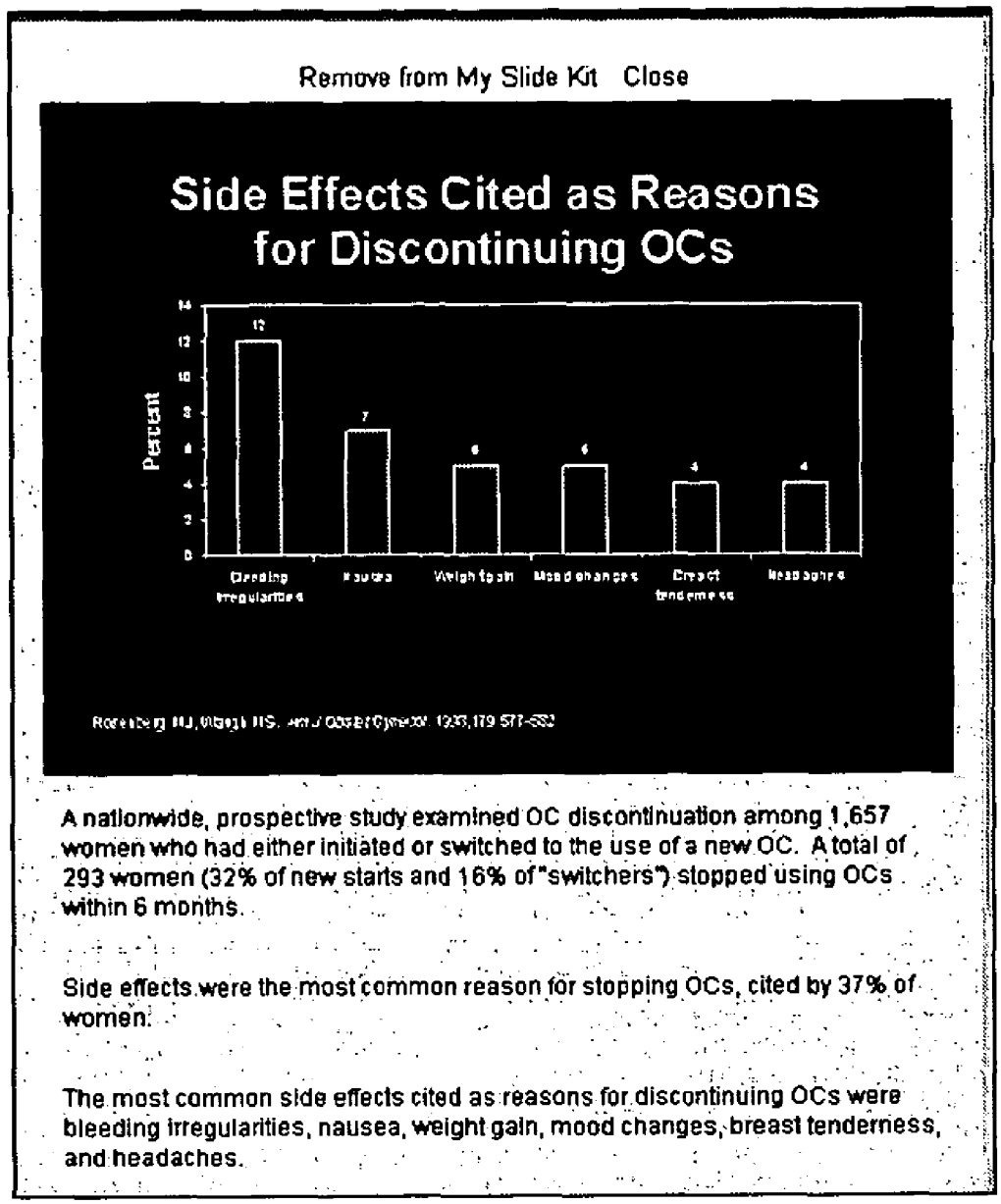
FIG. 12 is an embodiment of a display of the current invention.

FIG. 11 illustrates a completed slide search using the drop down menu as provided in the Search Slide portion. Each slide from the selected Master Slide Kit may be displayed as a thumbnail image in conjunction with a checkbox within the Search Slide portion of the Search Results window as again illustrated in FIG. 11. For slides to be added to a user developed presentation, the slides may be moved from the Search Slide portion to the Create Kits portion by selecting via the checkbox from the Search Slide portion and copying them to the Create Slide portion by clicking the Add Slide hyperlink icon as illustrated, for example, in FIG. 11. The Search Slide portion may further include a Select/Deselect All Slides hyperlink which may allow a user to select all the slides to be copied to the Create Kits portion or to Deselect any slide previously selected by the user. Further, the Search Slide portion may provide further search refinement within the chosen Master Slide Kit by clicking the Search hyperlink allowing the user to search individual slides for specific keywords or text phrases. Further, given that the thumbnail images of the slides contained within the Master Slide Kits may be of such a size so that the text of the slide is hard to read, a user may click on the individual thumbnail image to have displayed an enlarged image of the individual slide, as illustrated in FIG. 12, for example. This enlarged image may be shown within a distinct window and may include the slide image and any comments associated with that slide. A window showing the enlarged image may also include a hyperlink allowing the user to close the window and return to the Search Results window or allow the user to remove the slide within the distinct window from the Create Kits portion if added to that portion. As further illustrated by FIG. 11, a user may remove slides from the Create Kits portion by clicking the Remove Slides hyperlink. A user may also save the customized presentation created in the Create Kits portion by clicking the Save hyperlink or downloading the presentation in a suitable form such as, for example, in PowerPoint format by clicking the Download PowerPoint Presentation hyperlink.

A user may add slides to a previously created presentation slide kit within the system as illustrated in FIG. 13. The system may allow the user to add slides to an existing slide kit using components of Master Slide Kits previously loaded into the system or by using newly created portions saved to the system by other users. By clicking the My Slide Kits button, the system will display previously created slide kits created by the user, As further illustrated in FIG. 13, the information associated with each created slide kit includes in part, as discussed above, the Slide Kit Name, which may also be a hyperlink allowing the user to simply click the name of the created customized slide kit to access the kit for editing purposes. The user may also click the Download PowerPoint File button to launch a slide kit or presentation within PowerPoint and/or to download the file directly to an alternate storage medium.

Figure 14:
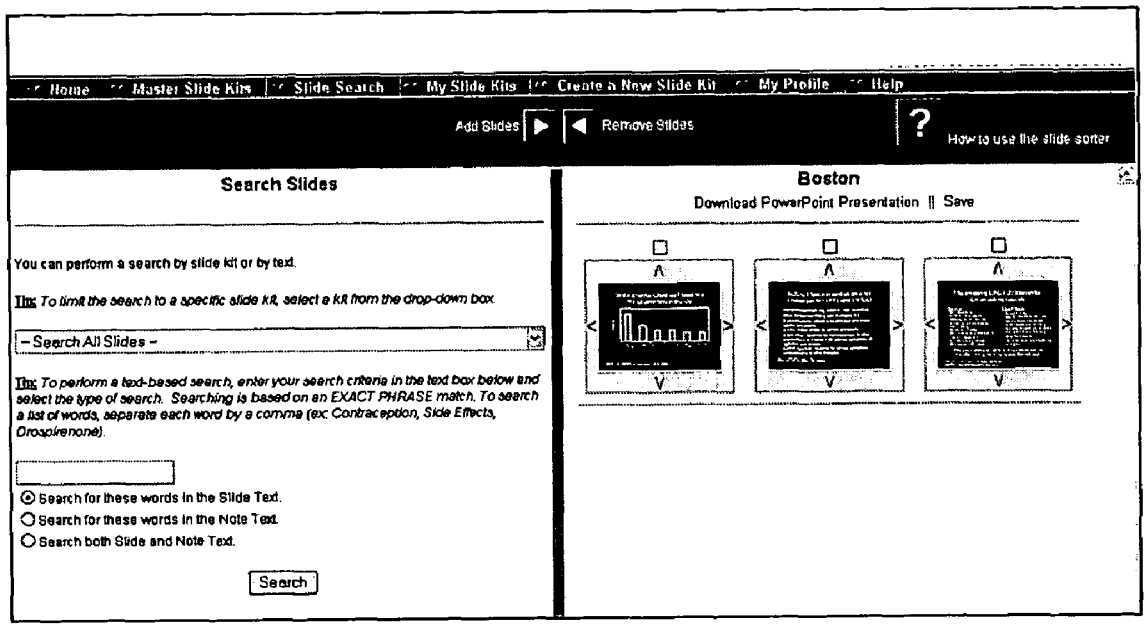
FIG. 14 is an embodiment of a display of the current invention.
Figure 15:
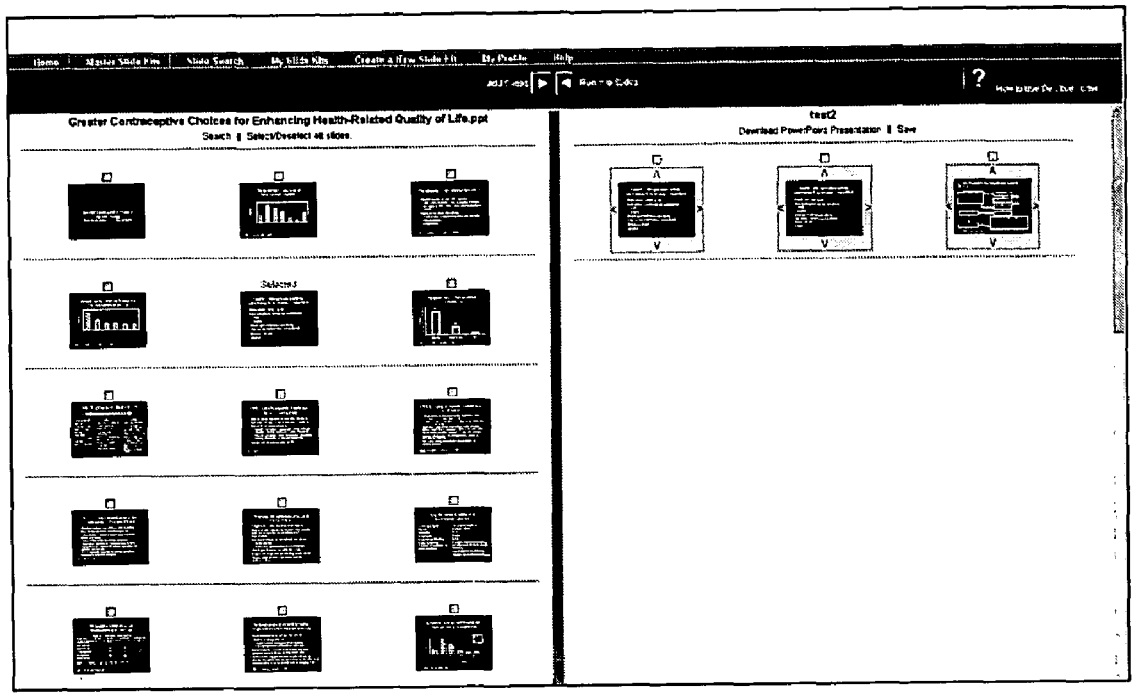
FIG. 15 is an embodiment of a display of the current invention.

Clicking the hyperlink sensitive name of the customized slide kit will allow a user to access the Searching For Slide Kits window as illustrated in FIG. 14. Similarly to Searching For Master Kits window, the Search for Slide Kits window may be divided into a Search Slides portion and a Customize Slide Kits portion. The Search Slides portion retains the functionality as discussed above, namely, the ability for the user to search in a variety of ways the Master Slide Kits existing on the system. The Customize Slide Kits portion may provide user access to a previously created slide kit which the user may desire to edit. A user may remove slides from the Customized Slide Kits portion by clicking the Remove Slides hyperlink icon or search for a particular Master Slide Kit and add slides from the Search Slides portion to the Customized Slide Kit portion as illustrated in FIG. 15.

Figure 17:
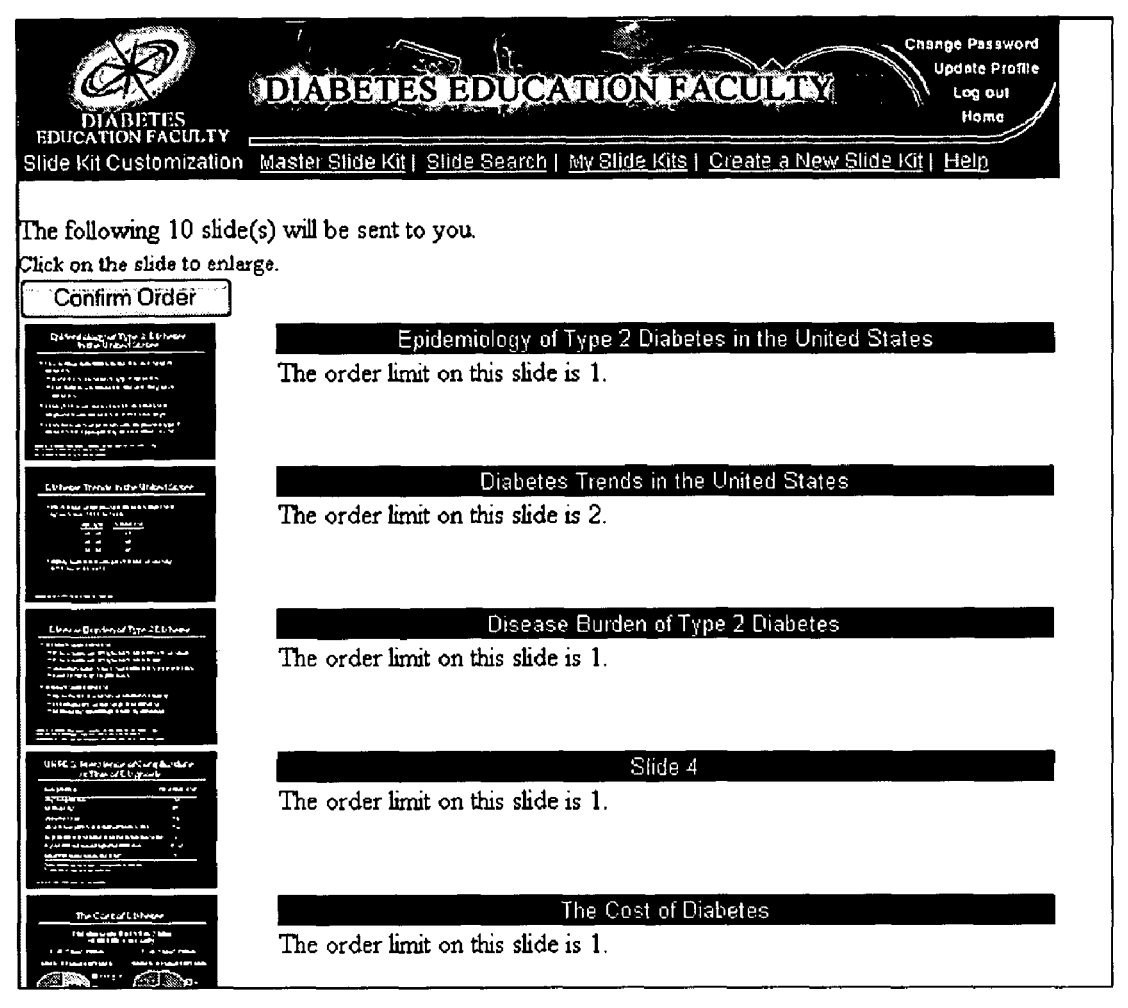

Another embodiment of the present invention may provide the user the ability to alter the download capabilities of the system or provide for an alternate means of obtaining presentations created within the system as illustrated in FIG. 16. The system may provide for a Non-editable File/Download Option such that presentations downloaded in a suitable format such as, for example, in PowerPoint format, which may not be editable in their current downloaded form. The system may further provide users with the ability to order and have deliverable a presentation in a more hard copy format such as, for example, as overheads or 35 millimeter slides. By clicking the Order Slides hyperlink, as illustrated in FIG. 16, a user will be provided an Order List window as illustrated in FIG. 17. The Order List window may allow a user to review the slides in the order, delete slides that the user does not wish to have ordered in hard copy or add slides from other presentations to a hard copy order. A user may click to confirm the order being placed by clicking the Confirm Order button as illustrated in FIG. 17. The user upon clicking the Confirm Order button may be presented with the Shipping Information window which may ask the user where hard copies of the slides should be shipped. The information requested in the shipping information window may include the name of the user; the address type, whether residential or business; address or mailing information; phone contact; fax number; and e-mail address, for example. Once the user has populated the appropriate fields in the Shipping Information window, the user may click the Confirm Order button which will then allow the system to process the user's order for hard copy slides.

Figure 19:
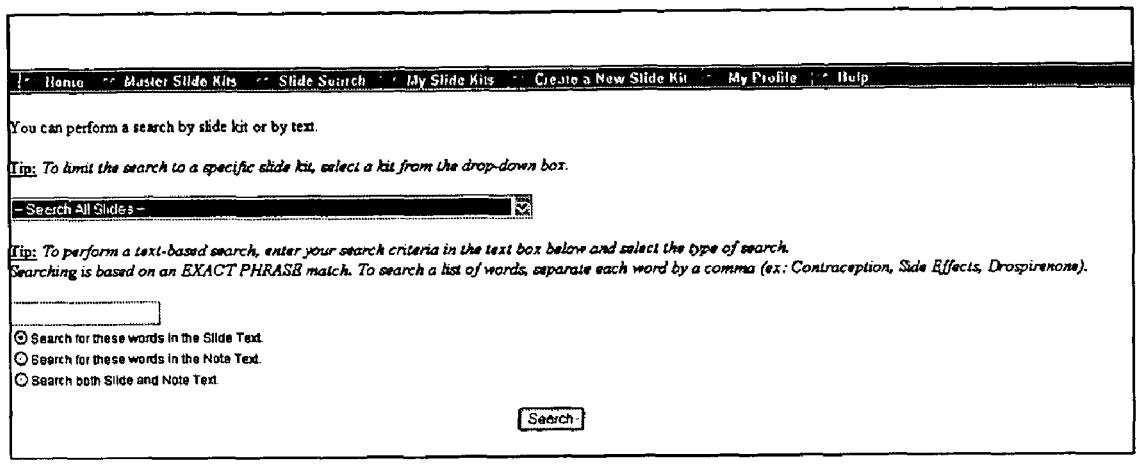
FIG. 19 is an embodiment of a display of the current invention.
Figure 20:
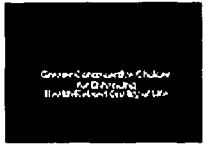
FIG. 20 is an embodiment of a display of the current invention.

The Slide Customization System offers a unique searching capability not found in other web-based presentation kit tools. Specifically the system may allow the user to conduct a keyword search to individual slide and note text level. The user may then incorporate an individual master slide; not necessarily the entire master kit. This may provide efficiency not found in other known systems. A user may click the Slide Search button from the main menu which may forward the user to a search window as illustrated in FIG. 19. The Search Slides Tools illustrated within the search window. may allow a user to display master slides based on user defined criteria. A user may select a specific slide kit or search all sides contained within the system through the use of a dropdown list. If a desired slide kit is found within the dropdown list, the user may click the hyperlinked name of the slide kit to further access the slide kit within the system. A user may also type a keyword or a text string phrase in the text box provided in the search window, which may allow the user to search all slides available within the system as previously discussed above. When using a keyword or text string search, a user may view results of such a search in the Master Slide Results window as illustrated in FIG. 20.

The Master Slide Results window may include a number totaling the number of slides returned from the search, the slides or master kits captured by the search and the title of the Master Slide Kit, for example. The search results may return individual slides compatible with the search query contained within various master slide kits. By way of non-limiting example only, a search for the keyword 'health' may return an individual slide which includes the word 'health' further included in a Master Slide Kit entitled "Health Concerns Impacting Contraceptive Therapy Selection." In this example, the keyword search selected the slide based on the word 'health' existing within the slide, not based on the word 'health' existing in the Master Slide Kit title. The search performed by the system may, in the alternative, search for keywords or text phrases within just the title of Master Slide Kits and/or both the title of the Master Slide Kit and individual slides within the system. From the search results within the Master Slide Results window, a user may further select or deselect slides, add selected slides to an existing kit or add selected slides to a new kit accessing such functionality by clicking on hyperlinks named the same. Selection and deselection of slides within the Master Slide Results window may also be accomplished by clicking the Check box associated with each individual slide results. The Search Results window may also include thumbnails of the individual slides returned in the search thumbnails displayed may be clicked on individually to display an enlarged version of the slide and may also include any text or comments associated with the slide and as previously explained above.

Figure 4A:
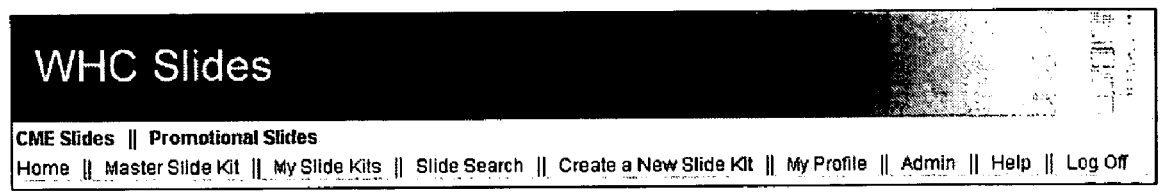
FIG. 4A is an embodiment of a display of the current invention.

Some administrative tasks, such as altering user profiles, may be performed by individual users. However, many tasks within the slide customization system are restricted and designed for use by authorized system administrators. These restricted tasks may include, for example, adding or deleting master slide kits from within the system, adding, deleting or changing user profiles and altering or changing system access on an individual user basis. Generally users of the system may enter and update their own personal profile that is contained within the slide customization system. This user profile may consist of a first name, last name and password, for example. The user profile window as illustrated in FIG. 21 may be used for changing information associated with an individual user such as the users first name, last name, password, address, contact information both personal and business and other identifying information. The profile window may be accessed by a user of this system by clicking the My Profile button as illustrated in FIG. 4. A profile window of any user may be accessed by an administrator of the system by clicking the Admin button as illustrated in FIG. 4A and then clicking the User Manager button to further access a profile window of a particular user. The profile window may most often be used by a user of the system to change or update passwords.

Figure 22:
FIG. 22 is an embodiment of a display of the current invention.

Further users of the system and/or authorized administrators may add or remove master slide kit presentations from the slide customization system. Master slide kits are provided, for example, by companies for use by their employees in creating further slide presentations. By way of non-limited example only, a pharmaceutical company may produce a slide presentation that has gained approval by their legal department. Such a presentation may be presented in the slide customization system as a master slide kit from which, for example, representatives of the pharmaceutical companies may draw from for the creation of further slide presentations. Although access may vary from clicking the Admin or My Profile buttons or simply typing a direct address into a internet browser, the Master Kit Administration window as illustrated in FIG. 22 may allow a user or administrator of the system to add, delete or edit master slide kits. The master kit administration window may allow a user to create a new presentation, delete an existing presentation or edit an existing presentation. To delete or remove a master kit from the system, the user may click the X hyperlink shown in conjunction with the existing master slide kit title as presented in the Master Kit Administration window. This window further includes the group associated with the particular master slide kit and the number of slides contained therein. A user and/or administrator of the Slide Customization System may add presentations to the system by clicking the New Presentation button as illustrated in FIG. 22. Following the clicking of the Create New Presentation hyperlink or the presentation icon as presented in FIG. 22, the Adding New Master Presentation window as illustrated in FIG. 23 will be presented. Once a name for the new master slide kit has been entered in the text box provided, clicking the Save button may add the presentation to the Slide Customization System. The Adding New Master presentation window may also provide for the entry of a group to be associated with the presentation be added to the system. Once the name and/or group of the new presentation is added to the system, a user may be returned to the Master Kit Administration window as shown in FIG. 22. By way of non-limiting example only, a user may have added a slide presentation with the title "CCME" which may be shown in the Master Kit Administration window as having just one slide. A newly created master slide kit may have then associated with it a slide presentation from outside or within the system such as, for example, a power point presentation. This association of a slide presentation with a master slide kit may require authorized administrative access and/or may only be completed by an authorized administrator. To associate a slide presentation with a master slide kit the administrator may click on the title of the presentation as shown in the window illustrated in FIG. 22.

Figure 26:
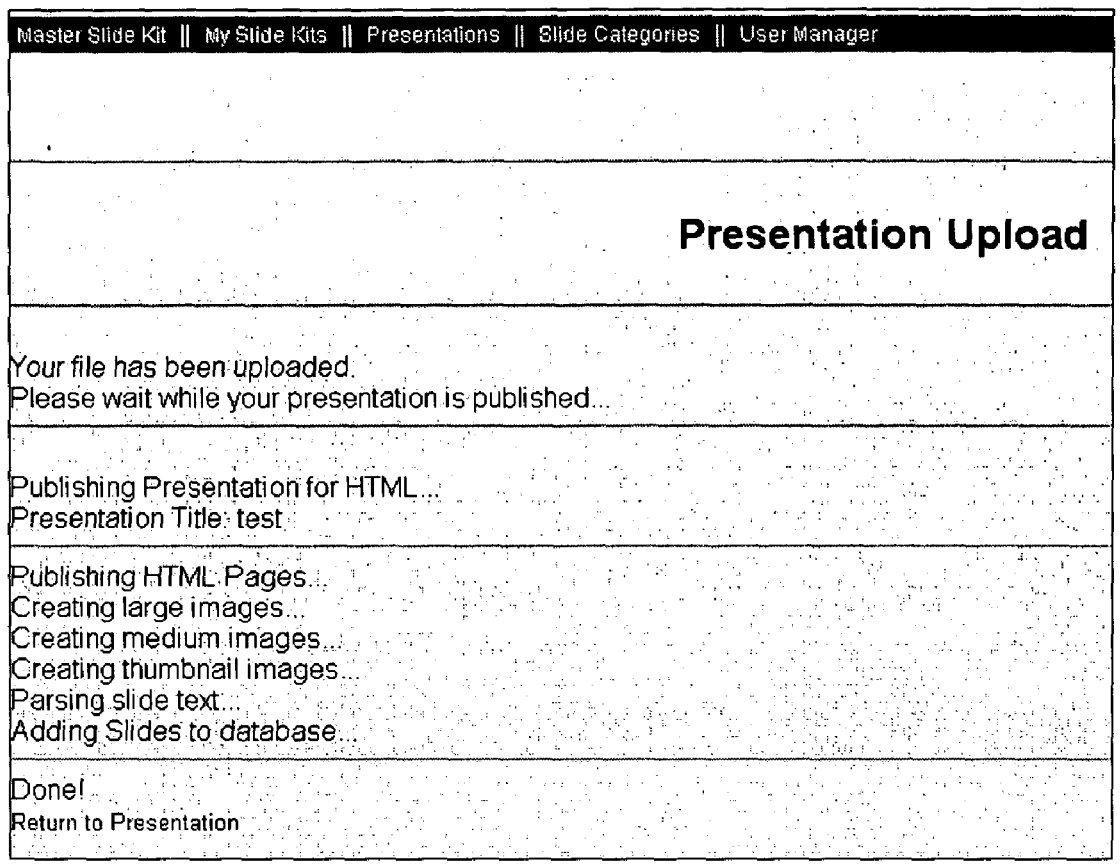
FIG. 26 is an embodiment of a display of the current invention.

As illustrated in FIG. 24, some slide presentations may exist within the Slide Customization System that may be associated with a newly created or added master slide kit. Slide presentations existing within the system may be listed in the Power Point File administration window and may be uploaded by clicking on the title of the slide presentation. Such files may also be deleted from the Power Point File administration window by clicking the X hyperlink as previously discussed above. Slide presentations may also be uploaded from outside the slide customization system by clicking the upload hyperlink. The Upload Screen window, as illustrated in FIG. 25, may allow a user to type in the direct address for file location for the slide presentation sought or may allow a user to browse a local computer or connect to network by clicking the browse button. Once a slide presentation is located and the appropriate information is populated in the text-box provided, the slide presentation may be associated with the master slide kit by clicking the upload button. The presentation upload process is illustrated more fully in FIG. 26 and may provide the administrator with status updates as the slide presentation is uploaded and completed. Once the presentation upload window has signaled successful completion of the upload process, the administrator may click the return to presentation hyperlink to return to the master kit administration window for confirmation that the uplink has been completed or directly to the main menu of the slide customization system.

Figure 27:
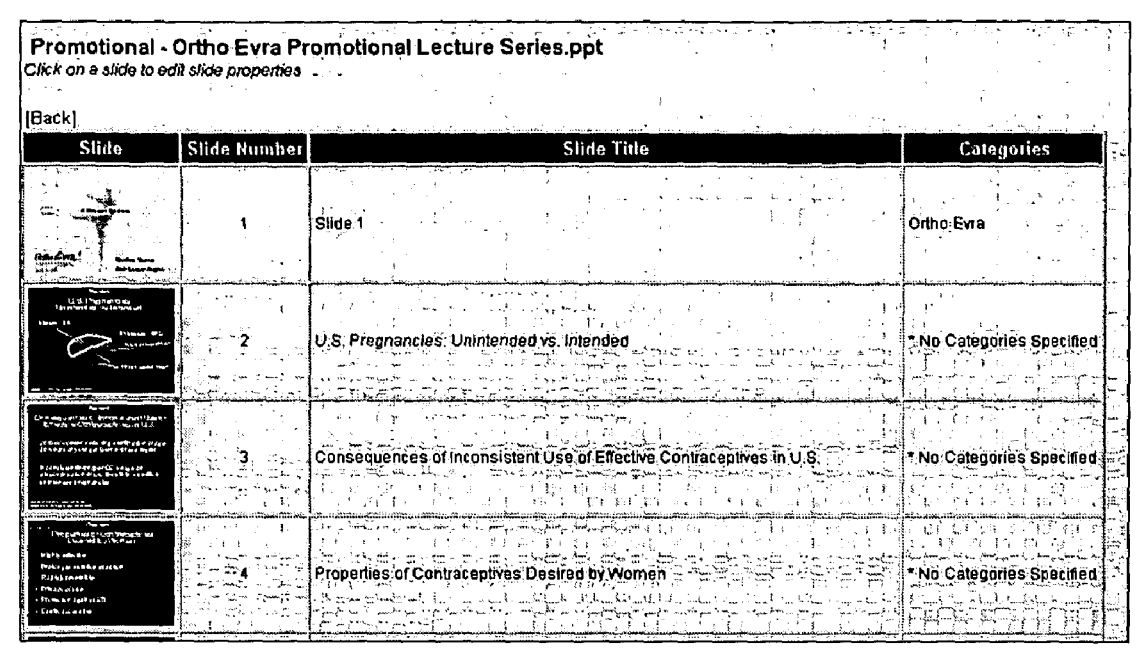

An administrator may also rename individual slides within a master slide kit and assign slide level categories for the individual slides within each master slide kit. To access this Slide Rename window as illustrated in FIG. 27, an administrator may click the title of a presentation from the Master Kit Administration window of FIG. 22 and then choose the slide presentation associated with that master slide kit from the list provided in the Power Point File administration window as illustrated in FIG. 24. Clicking on the title provided, will allow the administrator to access the Slide Rename window. The Slide Rename window may provide a thumbnail display of each individual slide contained within the selected slide presentation, a numerical designation of each individual slide, the title of each slide and/or the category each individual side has been placed into, if any, for example. To further assist with organizing slides between presentations and master slide kits, thus creating a stronger web of information regarding subject matter contained within the slide customization system an administrator may change, add or delete titles associated with each slide and associate each slide with categories contained within the slide customization system. By clicking on a thumbnail of a slide shown in the Slide Rename window an administrator may be presented with the Slide Rename window as illustrated in FIG. 28. The Slide Rename window may present the title of the slide selected, if any, and may present categories contained within the slide customization system for example. The title of a slide may be changed by editing the text within the text box provided for the title of each slide. Categories presented in the Slide Rename window may be associated with each slide by clicking the check box on and off thus selecting and deselecting the association of the categories provided to the selected slide. Modifications made within the slide rename window may be saved to the system by clicking the Save hyperlink.

Figure 29:
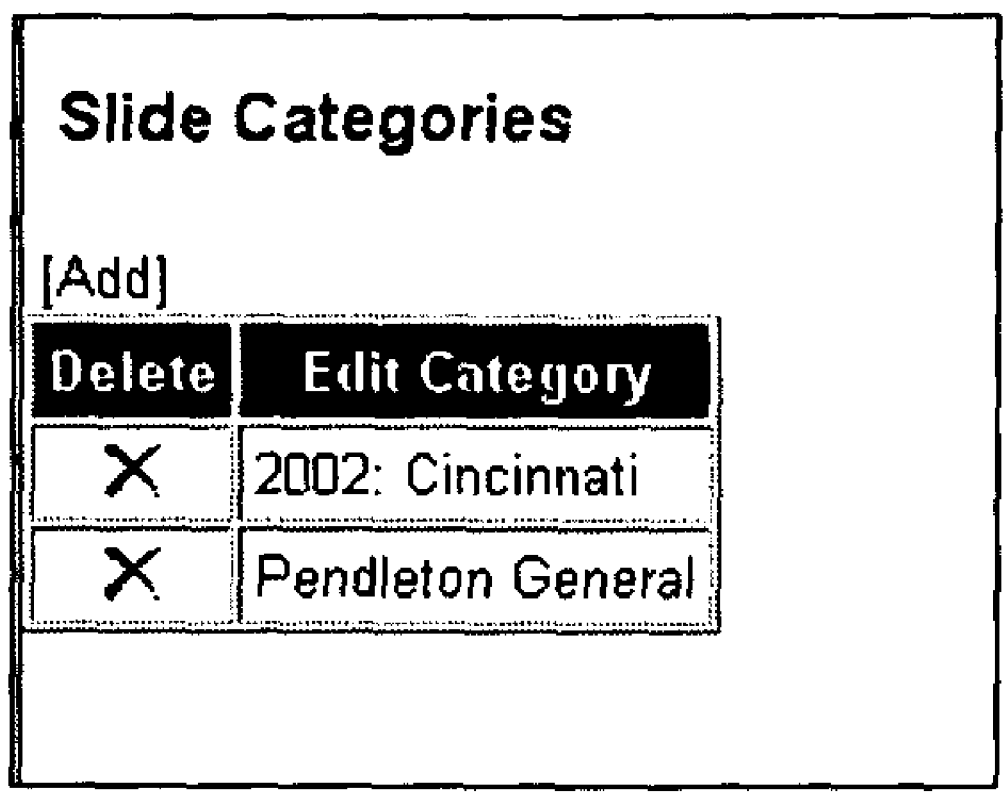
FIG. 29 is an embodiment of a display of the current invention.
Figure 30:
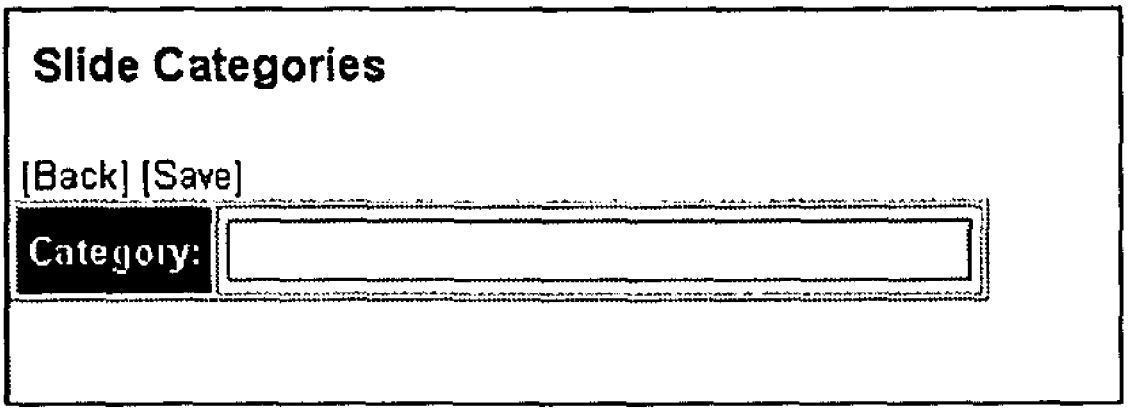
FIG. 30 is an embodiment of a display of the current invention.

Individual slides may have associated with them a particular title and may also have a category or categories associated with them as described above. The addition or deletion of categories from the slide customization system is illustrated in the editing slide designations window of FIG. 29. From this window, an administrator may add or delete categories that may be assigned to individual slides. As previously described above with other portions of the system, a category may be deleted by clicking the X button associated with each category title. A category may be edited by clicking the hyperlinked title of the category or a category may be added to the system by clicking the add hyperlink as illustrated in FIG. 29. The addition of the slide category and/or the editing of a slide category may take place in the slide category window and illustrated in FIG. 30. The text box provided in the slide category window may contain the existing category name clicked from the editing slide category designations window for which editing may take place or the text box may be blank if, for example, an administrator clicked the add hyperlink for the addition of the new category to the system. The text box may be altered and changes saved to the system by clicking the Save hyperlink as shown in FIG. 30.

Figure 32:
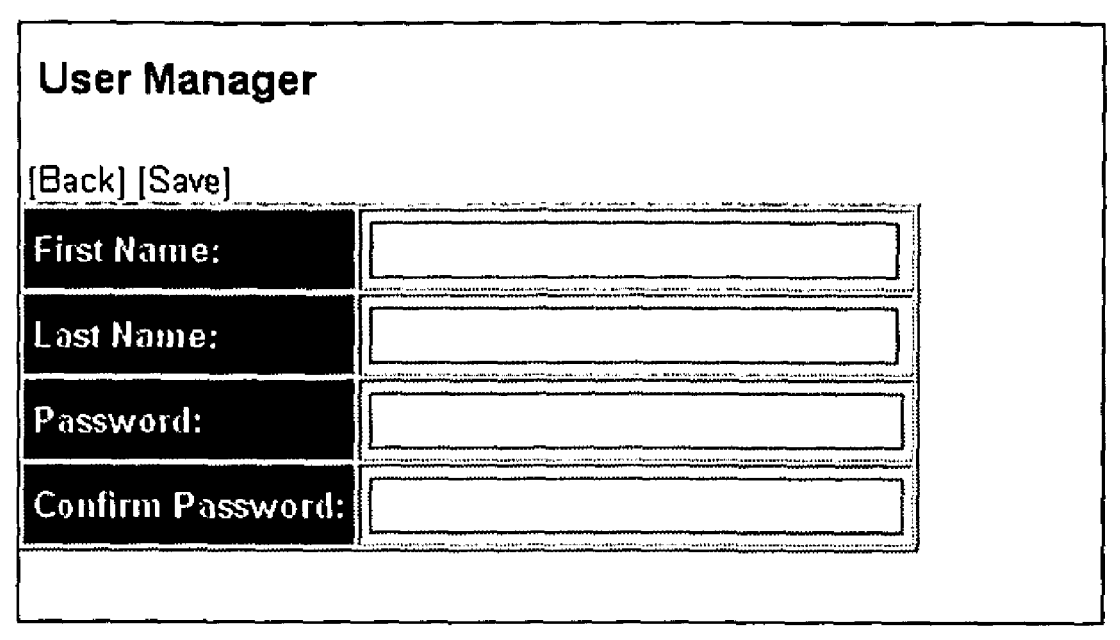

An administrator may also add and delete users from the Slide Customization System by accessing the Edit Users Accounts window as illustrated in FIG. 31. This window may display current or existing users of the system indicating the users name, logon I.D. and listed e-mail address, for example. The edit users accounts window may also list existing users in alphabetical order according to their last name contained in their user I.D. An administrator may delete users from the system by clicking the delete or X hyperlink as previously described above associated with each user. An administrator may find particular names within the system by scrolling through the list of users and may also jump to portions within the list by clicking the appropriate hyperlink letter associated with the first letter of the sought users last name, for example. A user may be added to the system by the administrator by clicking the Add New hyperlink from the edit users accounts window. An administrator may add or edit information associated with the user of the system using the user manager window as illustrated in FIG. 32. The text fields provided in the user manager window may include but are not limited to first name of the user, last name, password and a confirmatory password field. An administrator who is editing an existing user's profile may be presented with populated fields in the user manager window. Once information is entered and/or edited within the user manager window, changes may be saved to the system by clicking the Save hyperlink.

Figure 34:
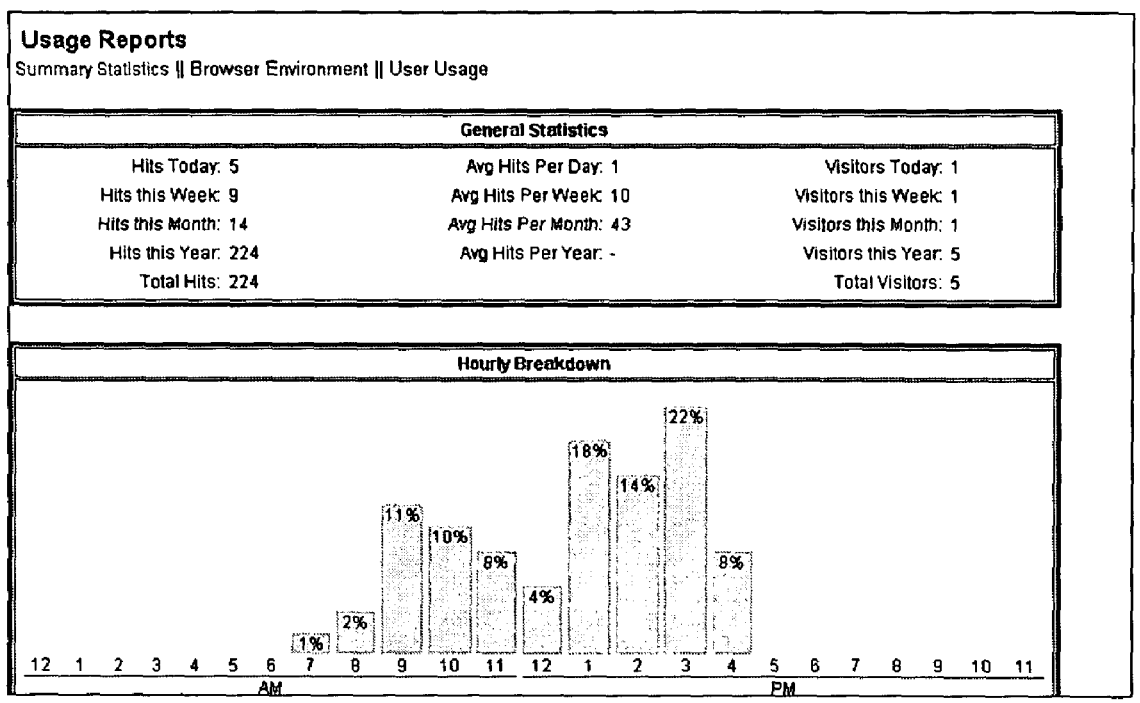
FIG. 34 is an embodiment of a display of the current invention.

The slide customization system may further provide an administrator with access to reporting functionality, as shown in FIG. 34. The reports available to the administrator in the report list window may include, for example; summary statistics, visitor browser environment, and, individual user usage. These reports may also be accessed by clicking the hyperlink entitled the same. For example, by clicking the hyperlink entitled summary statistics, the administrator may access a summary statistics report window illustrated in FIG. 34. The summary statistics report window may include general statistics about the users and uses of the system. The summary statistics window may include a table entitled "general statistics" which may provide a count of the users of the system for the chosen day, the number of users for the chosen week, the number of users for the chosen month, the number of users for the given year, and the total users of the system since its inception, for example. The statistics report may also provide a graph incorporated in the statistics report which may provide, for example, an hourly breakdown graph. This graph may illustrate the usage of the system during a twenty-four hour period. By way of non-limiting example only, the hourly breakdown may show that during the time period from 7:00 am to 8:00 am the percentage of users using the system is three (3%), while that same time period in the pm, zero (0%) percent of users registered on the system.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and the equivalents thereof.

What is claimed is:

1. A topical presentation slide customization system being embodied in computer executable instructions embodied in at least one computer readable medium, comprising:
    an administrator embodied in the at least one computer readable medium, and configured to receive at least one topical presentation;
    at least one database embodied in the at least one computer readable medium, and configured to store at least one topical presentation;
    a validator embodied in the at least one computer readable medium, and configured to validate the at least one stored topical presentation with at least one validation attribute selected from a plurality of validation attributes, wherein the at least one database is configured to store the validation of the selected ones of the validation attributes against the at least one presentation;
    a compiler embodied in the at least one computer readable medium, and configured to manipulate at least a portion of the at least one validated topical presentation in accordance with an output request, and produce at least one other topical presentation; and
    a reporter embodied in the at least one computer readable medium, and configured to generate one or more of a group consisting of real time status of user activities, site usage by functionality, hits to the slide customization system, user browser environment, user referral information, and individual user usage.

2. The slide customization system of claim 1, further comprising a searcher embodied in the at least one computer readable medium, wherein the compiler is responsive to said searcher.

3. The slide customization system of claim 2, wherein the compiler being configured to produce at least one other topical presentation comprises the compiler being configured to produce at least one validated presentation responsively to the searcher.

4. The slide customization system of claim 1, further comprising an auditor embodied in at least one computer readable medium, and configured to audit creations, reads, updates, additions, edits and deletions from the at least one database.

5. The slide customization system of claim 1, wherein said administrator comprises a plurality of administrative controls, an information entry and management, and a security and access control.

6. The slide customization system of claim 4, wherein the auditor comprises at least one audit record, wherein each at least one audit record corresponds to an individual field in the at least one database.

7. The slide customization system of claim 2, wherein the searcher is configured to search keywords.

8. The slide customization system of claim 1, wherein a security and access control comprises at least two levels, wherein at least one of the levels is associated with system administrators and another of the levels is associated with client users.

9. The slide customization system of claim 1, wherein the reporter is configured to generate one or more of the group responsively to the administrator.

10. A method for managing at least one topical presentation slide, said method comprising:
    storing the at least one topical presentation slide in at least one database communicatively coupled to at least one computer;
    validating by the at least one computer, the at least one stored topical presentation slide with at least one validation attribute selected from a plurality of validation attributes;
    manipulating by the at least one computer, selected ones of the validated at least one topical presentation slide in accordance with an output request, providing at least one other topical presentation, wherein the manipulating is in accordance with at least one output selected from the group consisting of a report, a search result, and an order placement; and
    generating one or more of the group consisting of real time status of user activities, site usage by functionality, hits to the slide customization system, user browser environment, user referral information, and individual user usage; and outputting the at least one other presentation by the at least one computer.

11. The method for managing slides of claim 10, wherein the outputting is responsive to an inquiry and comprises outputting at least one validated presentation slide.

12. The method for managing slides of claim 10, further comprising auditing, by at least one computer, creations, reads, updates, additions, edits and deletions from the at least one database.

13. The method for managing at least one slide of claim 10, further comprising searching, by at least one computer, validated presentation slides and validation attributes in accordance with an inquiry from a searcher.

14. The method for managing at least one slide of claim 13, wherein the inquiry comprises at least one of at least a portion of at least one of the selected ones of the validation attributes and at least a portion of the at least one presentation slide.

15. A computer readable medium having stored thereon computer executable instructions comprising:

instructions for storing at least one topical presentation slide in at least one database communicatively coupled to at least one computer;

instructions for validating by the at least one computer, the at least one stored presentation slide with at least one validation attribute selected from a plurality of validation attributes;

instructions for manipulating by the at least one computer, the validated at least one stored topical presentation slide in accordance with an output request, providing at least one other presentation, wherein the manipulation is in accordance with at least one output selected from the group consisting of a report, a search result and an order placement; and instructions for outputting the at least one other topical presentation by the at least one computer.

16. The computer readable medium of claim 15, wherein said search result output is responsive to an inquiry.

17. The computer readable medium of claim 16, wherein the inquiry comprises at least one of at least a portion of at least one of the selected ones of the validation attributes and at least a portion of the at least one topical presentation slide.

18. The computer readable medium of claim 16, wherein the instructions for outputting comprise instruction for outputting at least one validated topical presentation slide.

19. The computer readable medium of claim 15, further comprising instructions for auditing, by at least one computer, creations, reads, updates, additions, edits and deletions from the at least one database.

20. The computer readable medium of claim 15, further comprising instructions for searching, by at least one computer, validated presentation slides and validation attributes in accordance with an inquiry from a searcher.

* * * * *